US00RE48897E

(19) United States
(12) Reissued Patent
Schultz

(10) Patent Number: US RE48,897 E
(45) Date of Reissued Patent: *Jan. 18, 2022

(54) LEARNING GAMIFICATION AND SAFETY CONTROL APPLICATION FOR MOBILE DEVICES

(71) Applicant: Scott Russell Schultz, Highland Park, IL (US)

(72) Inventor: Scott Russell Schultz, Highland Park, IL (US)

(73) Assignee: APP CAP LLC, Camden, DE (US)

( * ) Notice: This patent is subject to a terminal disclaimer.

(21) Appl. No.: 16/581,065

(22) Filed: Sep. 24, 2019

Related U.S. Patent Documents

Reissue of:
(64) Patent No.: 10,219,146
Issued: Feb. 26, 2019
Appl. No.: 15/095,125
Filed: Jun. 9, 2016

(51) Int. Cl.
*H04W 12/08* (2021.01)
*H04W 8/22* (2009.01)
(Continued)

(52) U.S. Cl.
CPC ..... *H04W 8/22* (2013.01); *G06Q 10/109* (2013.01); *G09B 5/00* (2013.01); *G09B 7/00* (2013.01);
(Continued)

(58) Field of Classification Search
CPC ..... H04W 12/08; H04W 4/02; H04W 4/90; H04W 12/06; H04W 4/027; H04W 48/04; H04W 88/02; H04W 4/046; H04W 4/12; H04W 8/22; H04W 4/023; H04W 8/14; H04W 48/16; H04W 4/021; H04W 4/16; H04W 12/04; H04W 12/12; H04W 24/08; H04W 4/00; H04W 4/50; H04W 84/045; H04W 84/18; H04W 88/08; H04W 8/245; H04W 48/18; H04W 4/80; H04W 64/00; H04W 76/12; H04W 8/183; H04W 28/18; H04W 40/005; H04W 4/60; H04W 4/70; H04W 52/0209; H04W 52/22; H04W 52/281; H04W 52/30; H04W 52/367;
(Continued)

(56) References Cited

U.S. PATENT DOCUMENTS 8,437,744 B1 * 5/2013 Heins ..... H04L 51/38 455/412.1
8,490,176 B2 * 7/2013 Book ..... H04M 3/42161 726/17

(Continued)

*Primary Examiner* — Minh Dieu Nguyen
(74) *Attorney, Agent, or Firm* — Bishop, Diehl & Lee Ltd.

(57) ABSTRACT

An application for mobile devices that enables a server device to control multiple client devices with numerous features and capabilities relevant to both server and client devices, such as learning gamification and safety controls. Running on popular operating systems, this application is compatible with other mobile applications and provides a mechanism for the server device to override internal controls on one or more client devices with ability to configure access controls based on gamification features using parameters that include but not limited to applications, programs, goals, and rewards. This application includes safety and security control features that enables the server device to remotely monitor and control one or more client devices.

5 Claims, 9 Drawing Sheets

Examples of User Scenarios for Learning Gamification and Safety Control Application

(51) Int. Cl.

| | |
|---|---|
| ***H04W 12/37*** | (2021.01) |
| ***H04M 1/72463*** | (2021.01) |
| ***H04M 1/72427*** | (2021.01) |
| ***G06Q 10/10*** | (2012.01) |
| ***G09B 5/00*** | (2006.01) |
| ***G09B 7/00*** | (2006.01) |
| ***H04L 29/06*** | (2006.01) |
| ***H04L 29/08*** | (2006.01) |
| ***H04M 3/42*** | (2006.01) |
| *G06Q 30/02* | (2012.01) |
| *H04M 3/38* | (2006.01) |
| *H04W 88/02* | (2009.01) |

(52) U.S. Cl.

CPC ..... *H04L 63/105* (2013.01); *H04L 63/20* (2013.01); *H04L 65/1069* (2013.01); *H04L 65/4069* (2013.01); *H04L 67/125* (2013.01); *H04L 67/26* (2013.01); *H04M 1/72427* (2021.01); *H04M 1/72463* (2021.01); *H04M 3/42374* (2013.01); *H04W 12/08* (2013.01); *H04W 12/37* (2021.01); *G06Q 30/02* (2013.01); *H04M 3/38* (2013.01); *H04M 3/42144* (2013.01); *H04W 88/02* (2013.01)

(58) Field of Classification Search

CPC ..... H04W 56/0015; H04W 76/10; H04W 84/042; H04W 88/06; H04W 12/10; H04W 36/0094; H04W 40/08; H04W 40/12; H04W 48/20; H04W 4/029; H04W 4/06; H04W 52/0229; H04W 52/0235; H04W 52/0251; H04W 52/0274; H04W 60/00; H04W 68/00; H04W 72/042; H04W 72/085; H04W 72/1273; H04W 76/14; H04W 76/15; H04W 76/25; H04W 76/27; H04W 76/28; H04W 76/50; H04W 88/00; H04W 8/18; H04W 8/24; H04W 92/00; H04W 12/02; H04W 24/00; H04W 24/10; H04W 28/0236; H04W 28/06; H04W 28/08; H04W 36/32; H04W 4/18; H04W 4/20; H04W 4/24; H04W 52/50; H04W 72/02; H04W 72/04; H04W 72/0406; H04W 72/0413; H04W 72/0446; H04W 74/004; H04W 74/006; H04W 74/008; H04W 74/0833; H04W 76/11; H04W 76/16; H04W 88/04; H04W 8/005; H04W 8/04; H04W 84/12; H04W 88/021; H04M 1/72577; H04M 1/72527; H04M 1/67; H04M 3/436; H04M 19/04; H04M 1/66; H04M 1/72522; H04M 1/72552; H04M 2250/12; H04M 2250/22; H04M 3/38; H04M 3/42178; H04M 3/53308; H04M 3/54; H04M 11/04; H04M 15/80; H04M 15/8044; H04M 15/8055; H04M 15/8271; H04M 15/883; H04M 1/0254; H04M 1/03; H04M 1/04; H04M 1/21; H04M 1/22; H04M 1/57; H04M 1/6075; H04M 1/663; H04M 1/665; H04M 1/72519; H04M 1/72536; H04M 1/72544; H04M 1/72547; H04M 1/72566; H04M 1/72575; H04M 1/72583; H04M 2203/1091; H04M 2203/2011; H04M 2203/2044; H04M 2203/2072; H04M 2203/2077; H04M 2203/654; H04M 2207/206; H04M 2242/14; H04M 2250/02; H04M 2250/52; H04M 3/42; H04M 3/42017; H04M 3/42229; H04M 3/42314; H04M 3/4234; H04M 3/42374; H04M 3/428; H04M 3/46; H04M 7/006; H04M 7/127; H04L 63/083; H04L 63/101; H04L 63/0861; H04L 67/04; H04L 67/10; H04L 67/12; H04L 12/2803; H04L 63/102; H04L 63/107; H04L 63/126; H04L 12/6418; H04L 63/08; H04L 63/104; H04L 63/1441; H04L 63/145; H04L 67/125; H04L 1/1861; H04L 26/2601; H04L 45/026; H04L 5/0007; H04L 5/0044; H04L 5/0057; H04L 5/0094; H04L 5/0096; H04L 63/0272; H04L 63/062; H04L 63/0823; H04L 63/108; H04L 65/4069; H04L 67/26; H04L 67/306; H04L 67/34; H04L 12/5692; H04L 1/16; H04L 29/06; H04L 41/0893; H04L 41/22; H04L 43/0835; H04L 43/0858; H04L 43/10; H04L 47/25; H04L 51/12; H04L 51/38; H04L 61/10; H04L 61/1511; H04L 63/0227; H04L 63/12; H04L 63/1433; H04L 63/20; H04L 65/1006; H04L 65/104; H04L 65/1056; H04L 65/1069; H04L 65/80; H04L 67/02; H04L 67/025; H04L 67/16; H04L 67/18; H04L 67/20; H04L 67/2828; H04L 69/329

See application file for complete search history.

(56) References Cited

U.S. PATENT DOCUMENTS

| | | | | |
|---|---|---|---|---|
| 8,831,979 | B1 * | 9/2014 | Gerson | G06Q 20/3255 705/16 |
| 8,848,025 | B2 * | 9/2014 | Talukder | H04L 65/4076 348/14.08 |
| 8,863,237 | B2 * | 10/2014 | Pahlavan | H04L 63/08 726/3 |
| 8,909,211 | B2 * | 12/2014 | Huq | H04L 67/04 455/420 |
| 9,240,952 | B2 * | 1/2016 | Wheeler | H04L 67/10 |
| 9,578,113 | B2 * | 2/2017 | Sullad | H04L 63/0853 |
| 9,882,850 | B2 * | 1/2018 | Stuntebeck | G06Q 10/107 |
| 9,917,906 | B2 * | 3/2018 | Zhang | H04L 67/18 |
| 10,440,095 | B2 * | 10/2019 | Zhou | H04L 67/10 |
| 2004/0198335 | A1 * | 10/2004 | Campen | H04M 3/42144 455/419 |
| 2011/0078767 | A1 * | 3/2011 | Cai | G06F 21/6218 726/4 |
| 2011/0244836 | A1 * | 10/2011 | George | H04M 3/4234 455/414.1 |
| 2013/0017806 | A1 * | 1/2013 | Sprigg | H04M 1/66 455/411 |
| 2013/0040629 | A1 * | 2/2013 | Sprigg | H04W 4/50 455/419 |
| 2013/0072157 | A1 * | 3/2013 | Brewer | H04W 12/06 455/411 |
| 2013/0072158 | A1 * | 3/2013 | Brewer | H04L 63/126 455/411 |

* cited by examiner

LEARNING GAMIFICATION AND SAFETY CONTROL APPLICATION FOR MOBILE DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

With the proliferation of technology making mobile devices relatively inexpensive to own and affordable for parents, employers, organizations, and others to provide one or more client devices to their dependents, employees, contractors, or others. By enabling a server device with the ability to closely monitor and control usage of one or more client devices while encouraging and rewarding each user (dependent, employee, contractor, or other) for performing certain activities and tasks, along with reinforcement and rewards for achieving such criteria while performing the activities and tasks.

The Learning Gamification and Safety Control Application delivers parents, managers and others with peace of mind regarding their children, employees', or others' safety and security while utilizing a mobile device to browse the Internet, and access applications and content. With feature-rich user access and usage controls, parents and managers benefit from a user-friendly administrative interface while users operate their devices seamlessly. The Learning Gamification and Safety Control Application provides a mechanism for managing and mitigating foreseeable risks while using a mobile computing device and provides important safety and communication tools.

Dependents, employees, contractors, and others are often provided with a mobile device for entertainment or because their parent or employer wants quick access to call their dependent, employee or contractor. Resulting from the wide range of mobile device applications, holders of mobile devices often lose focus, poorly manage their time, and lose productivity due to playing games, watching videos, and searching the Internet, among other things. Examples include forgotten appointments, failure to communicate with others, failure to meet deadlines, failure to adequately prepare for important events or exams. This solution provides parents, employers, organizations, and others with the ability to effectively deploy one or more mobile devices with the Learning Gamification and Safety Control Application to enable a server device to configure, monitor, and control one or more client device features, applications, and content.

SUMMARY

Dependents, employees and contractors operating a client device will benefit from the task-oriented features that will so help improve learning; shared calendar and integrated timer that strengthens time management and concentration; advanced communications preferences with group policies for prioritizing and managing interactions and interruptions; enhanced security capabilities with device tracking for quicker response and one-touch device locator; safety dashboard for overseeing and preventing inappropriate content and usage; alert and notification engine to automatically communicate with either server or one or more client mobile devices based on system-defined and user-defined criteria.

In embodiments, a server device and one or more client devices include but not limited to mobile phones, tablets, and handheld or mobile computing devices with communications capabilities, ideal for members of one or more groups that may include but are not limited to family members, employees of a business, or members of an organization.

In embodiments, a server device includes a user interface for monitoring and managing each of one or more client devices. The server device provides an interface for establishing and configuring access and control for each of one or more client devices.

In embodiments, a client device includes a controller for managing, monitoring, and configuring user access to each application, feature, and content installed on the associated client device. Each client device is controlled by one or more authorized and associated server devices.

BRIEF DESCRIPTION OF THE DRAWINGS

Embodiments of Learning Gamification and Safety Control Application are described within and with reference to the following Figures. These same Figures are referenced throughout to such details that include but are not limited to features and components, capabilities, functionality and processes.

DETAILED DESCRIPTION

Overview

Figure 1:
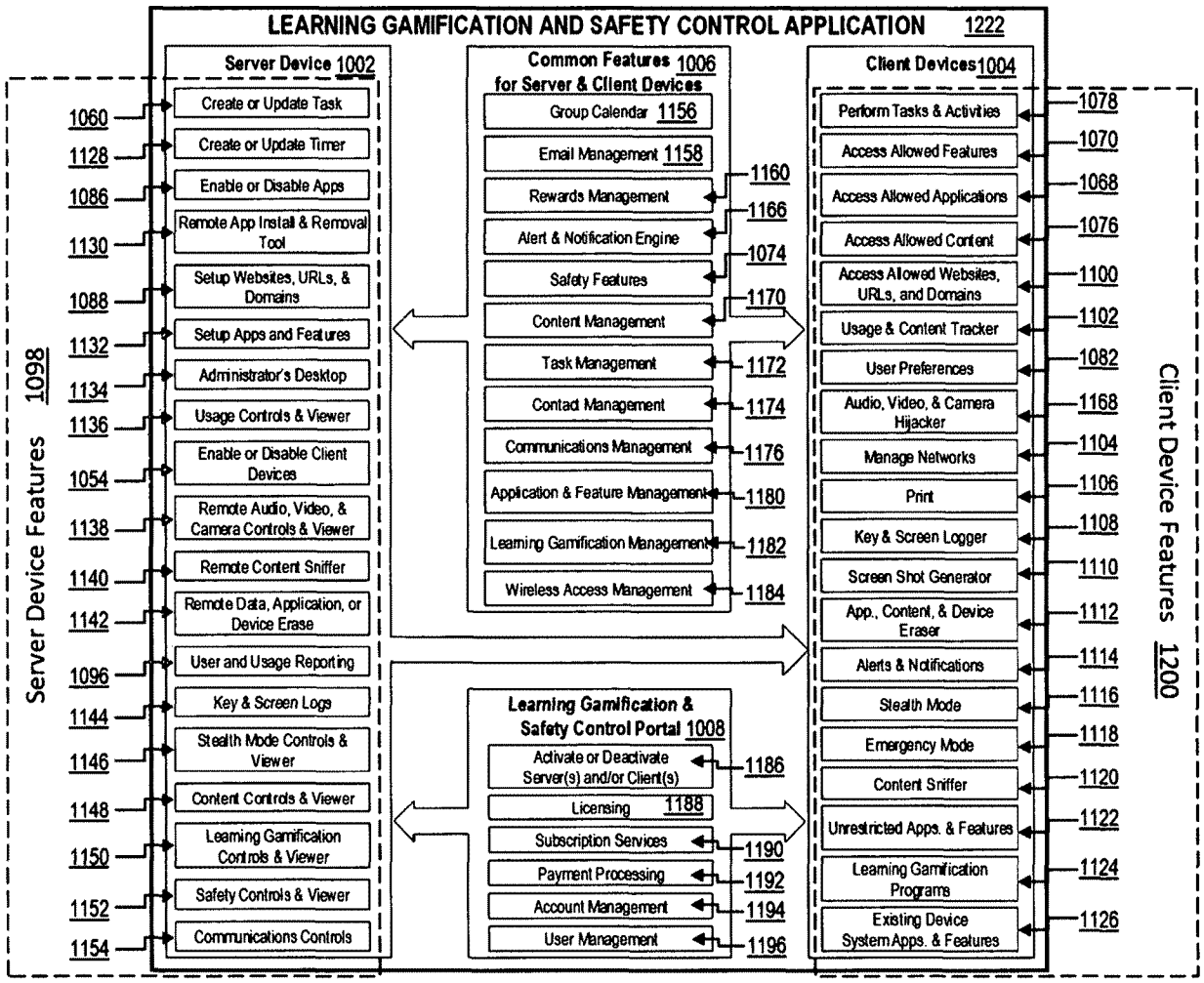
FIG. 1 illustrates the features available with the Learning Gamification and Safety Control. Application based on either the Server Device or Client Devices. These features include common features available to both Server Device and Client Device, along with features enabled by the Learning Gamification and Safety Control Portal.

The Learning Gamification and Safety Control Application features and components are described herein. In some embodiments, processes and techniques involving server and one or more client devices are described to share features and content. A server device may be configured to control one or more client devices. Based on parameters set by the server device, sharing of features and content may be enabled and accessible, enabled and restricted, or disabled to one or more associated client devices.

In addition, the common features for server and client devices with the Learning Gamification and Safety Control Application installed include direct two-way communications between the devices; group calendars; group task lists; one or more group policy alerts and notifications that may be associated to a task, meeting, email, appointment, timer or other activity; emergency mode with features that include user-defined programmable personal identification numbers (PINs) with preset actions and processes; contact manager application for the server device user to manage contacts on one or more client devices; audio and video telephone; text and SMS messaging.

In addition, when the Learning Gamification and Safety Control Application is installed on both server and one or more client devices, the server device will authenticate, configure, manage, and control the features, components, applications, and content accessible or non-accessible, enabled or disabled on each of one or more client devices. The server device with the Learning Gamification and Safety Control Application installed features, components, and applications on the client mobile device, such as but not limited to tasks, timers, application controller, URL controller, usage reporting, usage controller, administrator desktop, key and screen logger, remote application manager, mobile device manager, camera controller, screen shot generator, remote wipe, and network manager.

In addition, when the Learning Gamification and Safety Control Application is installed on both server and one or more client devices, the client devices will authenticate, provision, and grant full access into MI installed features, components, applications, and content to the server device while maintaining the communications services provided to each mobile device by their respective telephone service providers.

In addition, with the Learning Gamification and Safety Control Application, the features and components may employ a subscription service that provides a limited use license to access value-added services and features that seamlessly integrate and enhance the applications. Such value-added services and features include but are not limited to content sniffer that searches and quarantines inappropriate content (examples include images, videos, music, texts, social media, email, games, chat, etc.; payment processing for collecting subscription and licensing fees from customers; mobile device activation for validating license and subscription; account management for maintaining contact information and other relevant details; targeted advertising by customer segment.

FIG. 1 illustrates the features available with the Learning Gamification and Safety Control Application on the Server Device 1002 or Client Devices 1004. These features include Common Features 1006 available to both Server Device 1002 and Client Device 1004, along with the Learning Gamification and Safety Control Portal Features 1008.

FIG. 1 further illustrates the Server Device Features 1098 include but not limited to: Create or Update Task 1060; Create or Update Timer 1128; Enable or Disable Applications 1086; Remote Application Install and Removal Tool 1130; Setup Websites, URLs and Domains 1088; Setup Applications and Features 1132; Administrator's Desktop 1134; Usage Controls & Viewer 1136; Enable or Disable Client Devices 1054; Remote Audio, Video, and Camera Controls and Viewer 1138; Remote Content Sniffer 1140; Remote Data, Application, and Device Erase 1142; User and Usage Reporting 1096; Key and Screen Logs 1144; Stealth Mode Controls and Viewer 1146; Content Controls and Viewer 1148; Learning Gamification Controls and Viewer 1150; Safety Controls and Viewer 1152; and Communications Controls 1154. The Server Device 1002 will control the features available and accessible on one or more Client Devices 1004.

FIG. 1 further illustrates the Client Device Features 1200 include but are not limited to: Perform Tasks and Activities 1078; Access Allowed Features 1070; Access Allowed Applications 1068; Access Allowed Content 1076; Access Allowed Websites, URLs, and Domains 1100; Usage and Content Tracker 1102; User Preferences 1082; Audio, Video, and Camera Hijacker 1168; Manage Networks 1104; Print 1106; Key and Screen Logger 1108; Screen Shot Generator 1110; Application, Content, and Device Eraser 1112; Alerts and Notifications 1114; Stealth Mode 1116; Emergency Mode 1118; Content Sniffer 1120; Unrestricted Applications and Features 1122; Learning Gamification Program 1124; Existing Device System Applications and Features 1126.

FIG. 1 further illustrates the Common Features 1006 for Server Device 1002 and Client Devices 1004 include but are not limited to: Group Calendar 1156; Email Management 1158; Rewards Management 1160; Alert and Notification Engine 1166; Safety Features 1074; Content Management 1170; Task Management 1172; Contact Management 1174; Communications Management 1176; Application and Feature Management 1180; Learning Gamification Management 1182; and Wireless Access Management 1184.

FIG. 1 further illustrates the Learning Gamification and Safety Control Portal 1008 features include but are not limited to: Activate or Deactivate Server(s) and/or Client(s) 1186; Licensing 1188; Subscription Services 1190; Payment Processing 1192; Account Management 1194; and User Management 1196.

Figure 2:
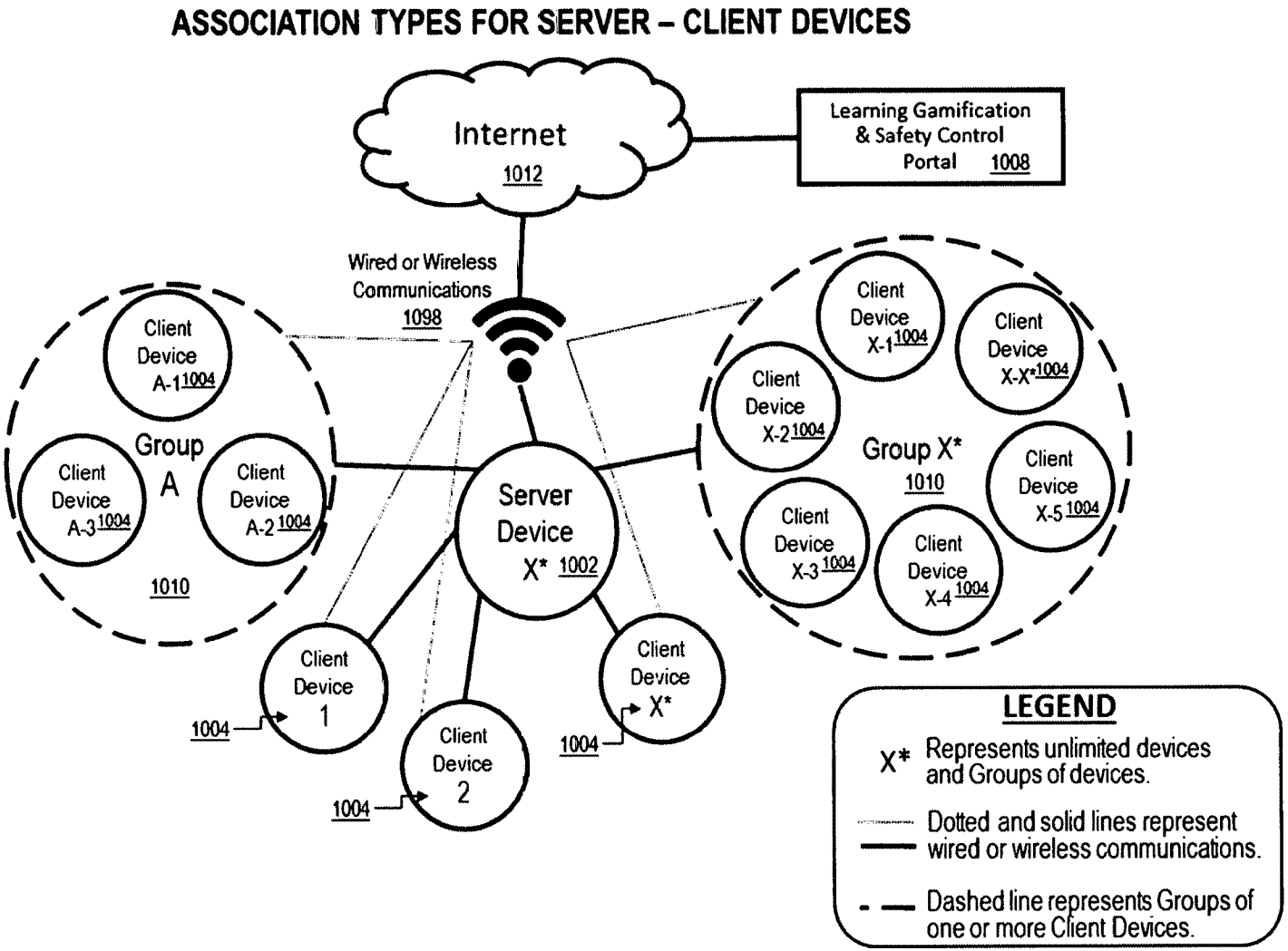
FIG. 2 illustrates the concept of hub and spoke mobile device computing with the Server Device controlling one or more Client Devices and groups of Client Devices. The Server Device communicates with the Client Devices using a Learning Gamification and Safety Control Portal accessible via wireless communications and the Internet.

FIG. 2 illustrates the Association Types for Server-Client Devices. The concept of hub and spoke mobile device computing with the Server Device 1002 controlling one or more Client Devices 1004 and/or one or more Groups 1010 of Client Devices 1004. The Server Device 1002 communicates with the Client Devices 1004 and Groups 1010 of Client Devices 1002 using the Learning Gamification and Safety Control Portal 1008 accessible via wired or wireless communications 1098 and the Internet 1012. This diagram illustrates the concept that one or more Server Devices 1002 control one or more Client Devices 1004 and Groups 1010 of Client Devices 1004. There is no limit on the number of Server Devices 1002, Client Devices 1004, or Groups 1010 of Client Devices 1004 that associate together. A Server Device 1002 may not control another Server Device 1002.

Figure 3:
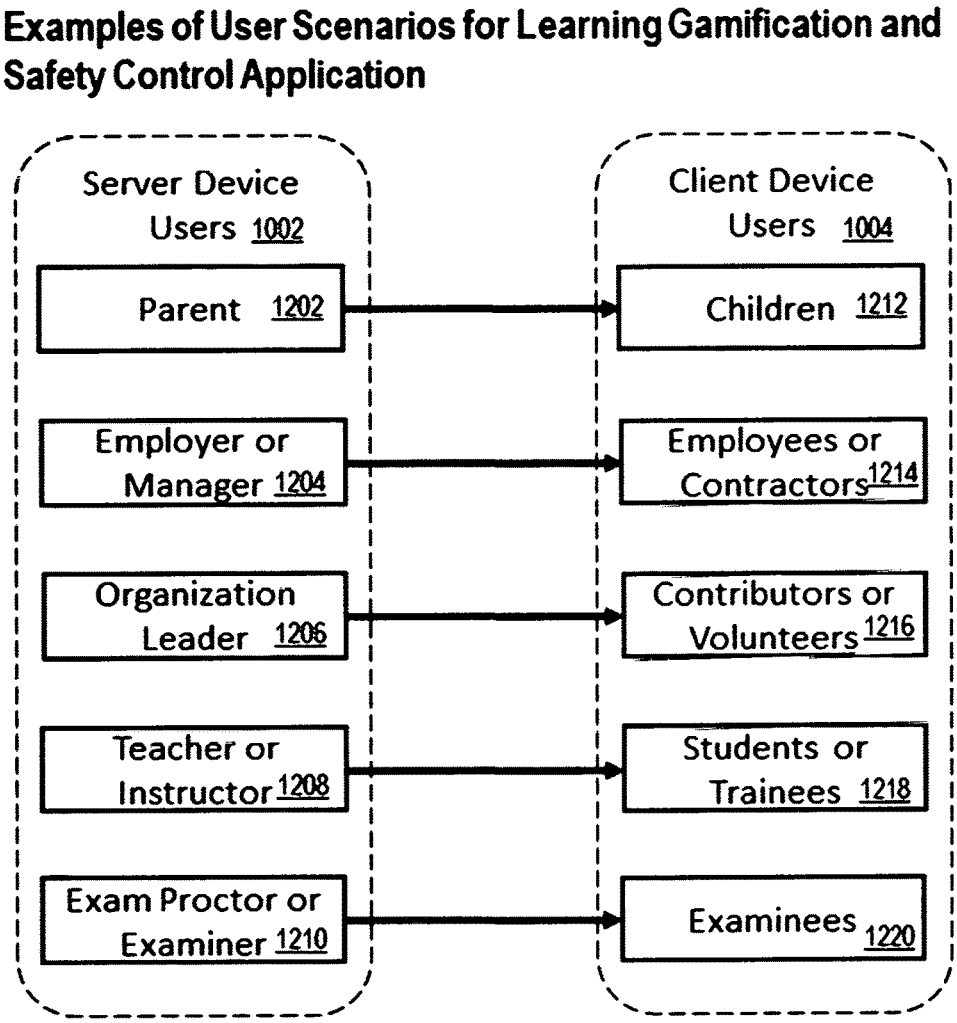
FIG. 3 illustrates examples of user scenarios for Learning Gamification and Safety Control. Application.

FIG. 3 illustrates Examples of User Scenarios for the Learning Gamification and Safety Control Application 1222. Examples of the types of users of Server Devices 1002 and Client Devices 1004 include but not limited to: Parents 1202 with Children 1212; Employers and Managers 1204 with Employees or Contractors 1214; Organization Leaders 1206 with Contributors or Volunteers 1216; Teachers and Instructors 1208 with Students and Trainees 1218; and Exam Proctors and Examiners 1210 with Examinees 1220.

Figure 4:
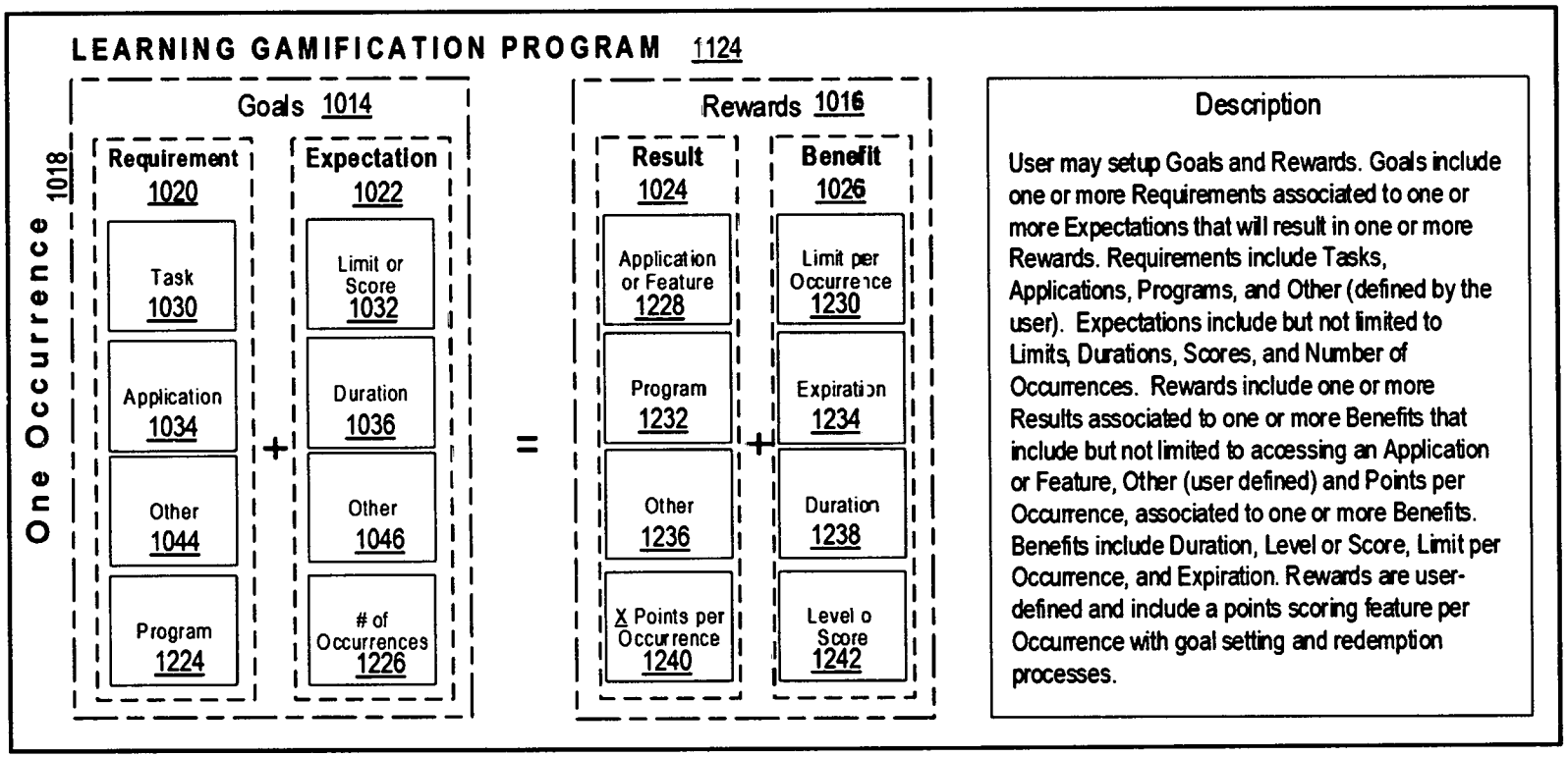
FIG. 4 illustrates the functionality of the Learning Gamification Program. The Learning. Gamification Program enables users to setup one or more Goals that, upon being established, allow the user to setup Requirements with one or more Expectations that result in one or more Rewards.

FIG. 4 illustrates the Learning Gamification Program 1124. The Learning Gamification Program 1124 shows how a Server Device 1002 user may setup one or more Goals 1014 to earn one or rime Rewards 1016. Goals 1014 are established using one or more Requirements 1020 with one or more Expectations 1022 that result in one or more Rewards 1016. The program is designed following a flexible architecture that allows the user to specify Requirements 1020 that comprises a Task 1030, Application 1034, Program 1224, and Other Requirement 1044. Requirement Tasks 1030 include Activities, Emails, Meetings, Appointments, or other actions or records that can be maintained using existing legacy applications, such as but not limited to: calendar 1156, 1072; alarm clock, phone, camera, messaging, mail, audio and video player, or other existing device system applications and features 1126 designed to operate seamlessly with the mobile computing device. Application 1034 includes each of one or more non-system applications installed on the mobile computing device. Program 1224 represents the ability for one or more Learning Gamification Programs 1124 to be subordinate to another Learning Gamification Program 1224, where completing one or more Learning Gamification Programs 1224 is required to successfully complete another Learning Gamification Program 1224 that packages all the subordinate programs into a higher-level program. Other 1044 includes any action that is completed without using the Client Device 1004. Expectation 1022 includes but not limited to one or more Limit or Score 1032, Duration 1036, Other 1046, and Number of Occurrences 1226 associated with a Goal 1014. When One Occurrence 1018 of the Learning Gamification Program 1224 occurs, where one or more Requirements 1020 and one or more Expectations 1022 are completed, one or more Rewards 1016 may be granted to the Client Device 1004 user. One or more Rewards 1016 are associated to one or more Goals 1014 and defined with one or more Results 1024 associated to one or more Benefits 1026. A Result 1024 includes but is not limited to accessing one or more Applications 1228 and Features 1232, Other 1236 (a user-defined field), and Points per Occurrence 1240, associated to one or more Benefits 1026 that include but not limited to ability to set a Limit per Occurrence 1230, Expiration 1234, Duration 1238, and Level or Score 1242. Rewards 1016 include short-term Rewards 1016, such as accessing games and applications on the Client Device 1004 or exercising to lose weight, and long-term Rewards 1016, such as exercising to earn a savory dessert, or completing an online certification program to qualify for a promotion.

Figure 5:
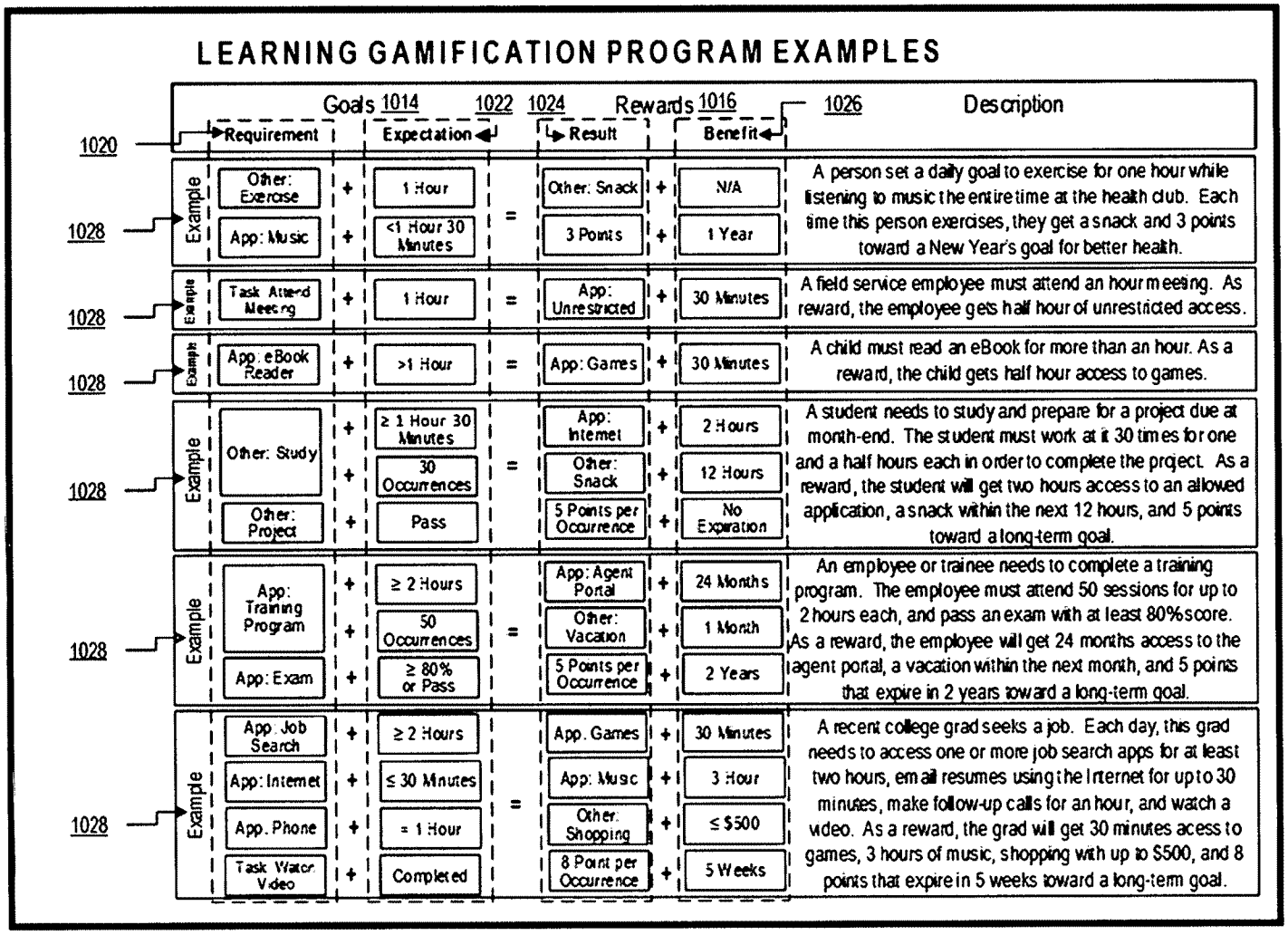
FIG. 5 illustrates the Learning Gamification Program Examples. These examples include but are not limited to those shown.

FIG. 5 illustrates the Learning Gamification Program Examples. A variety of Examples 1028 with narratives are shown about how the Learning Gamification Program 1124 may be utilized. These Examples 1028 include but are not limited to those shown in FIG. 5.

Figure 6:
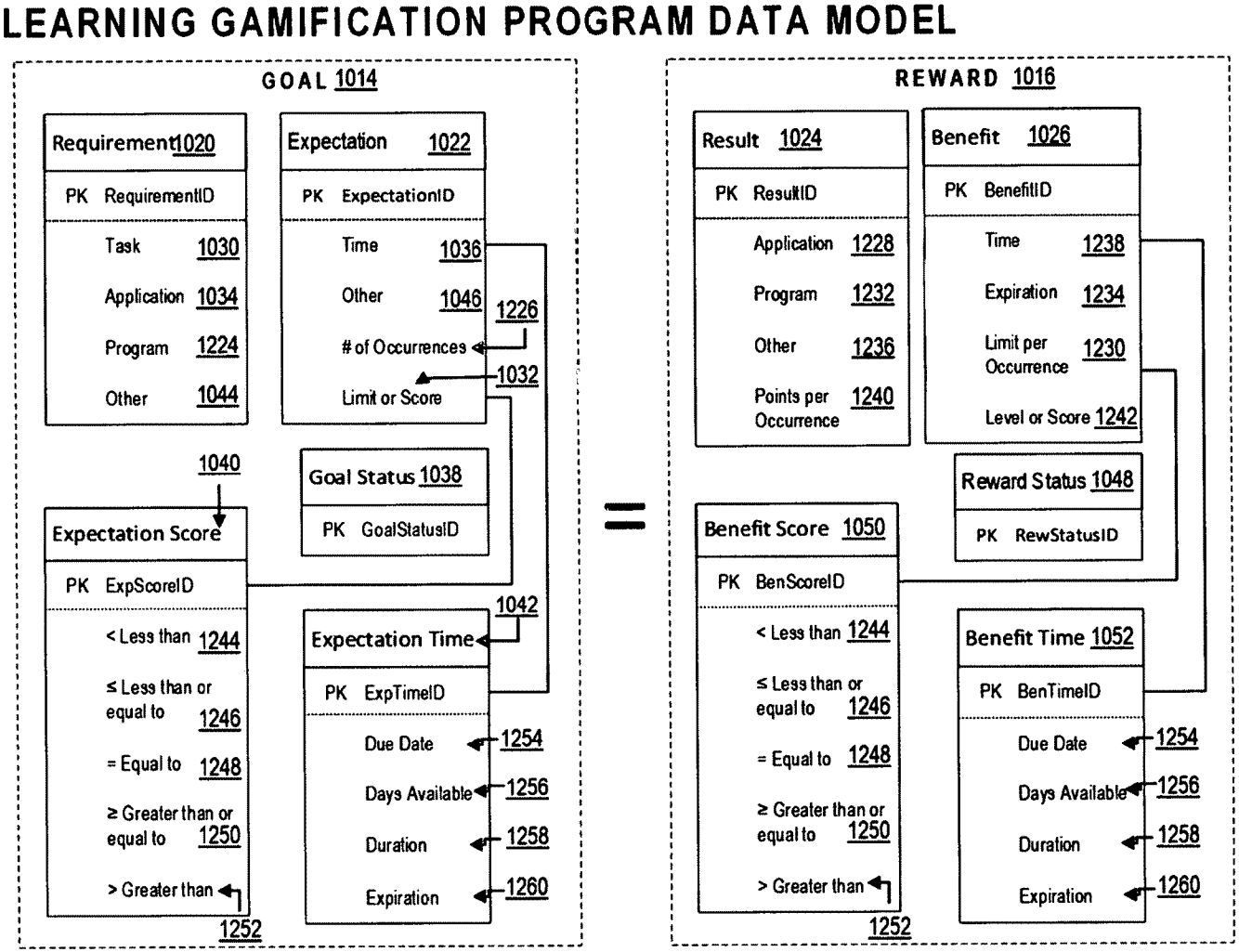
FIG. 6 illustrates the Learning Gamification Program Data Model. This model illustrates the critical field attributes necessary to configure one or more Goals with Requirements, Expectations, Scores and Times, associated to one or more Rewards with Results, Limits, Scores, and Times.

FIG. 6 illustrates the Learning Gamification Program Data Model. This model illustrates the critical field attributes necessary to configure one or more Goals 1014 with Requirements 1020, Expectations 1022, Expectation Scores 1040 and Expectation Times 1042, associated to one or more Rewards 1016 with Results 1024, Benefits 1026, Benefit Scores 1050, and Benefit Times 1052.

FIG. 6 further illustrates the Requirements 1020 include one or more of the following, but not limited to a Task 1030 or Activity, Application 1034, Program 1224, or Other 1044. Based on the selected Requirement 1020, the applicable Expectations 1022 will be dynamically visible, such as but not limited to Duration 1036, Other 1046, Number of Occurrences 1226, Limit or Score 1032, and Goal Status 1038. The user may set one or more Expectations 1022 to each Requirement 1020. Based on the selected Expectations 1022, the applicable Expectation Score 1040 and Expectation Time 1042 fields will be dynamically visible for the user to enter values. The Goal Status 1038 field will be automatically populated.

FIG. 6 further illustrates the Rewards 1016 include one or more of the following, but not limited to a Task 1030 or Activity, Application 1034, Program 1224, or Other 1044. Based on the selected Result 1024, the applicable Benefits 1026 will be dynamically visible, such as but not limited to Duration 1238, Expiration 1234, Limit per Occurrence 1230, and Level or Score 1242, and Reward Status 1048. The user may set one or more Benefits 1026 to each Result 1024. Based on the selected Benefits 1026, the applicable Benefit Score 1050 and Benefit Time 1052 fields will be dynamically visible for the user to enter values. The Reward Status 1048 field will be automatically populated.

Figure 7:
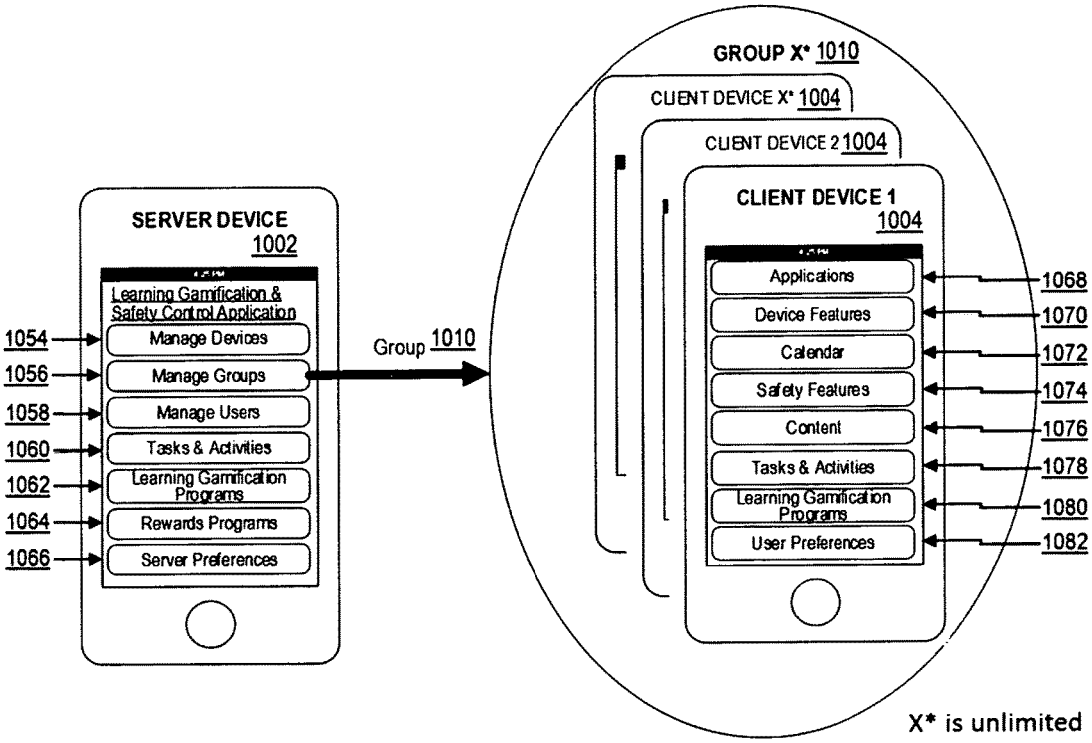
FIG. 7 illustrates an example of how the Server Device controls and manages related features and capabilities installed on one or more Client Devices.

FIG. 7 illustrates an example of Server Device Controls and Client Device Capabilities. This diagram shows how the Server Device 1002 controls and manages related features and capabilities installed on a Group 1010 of one or more Client Devices 1004, whereas the number of Groups 1010 and number of Client Devices 1004 are unlimited by the Learning Gamification and Safety Control Application. The Server Device 1002 controls and manages related features and capabilities installed on one or more Groups 1010 of one or more Client Devices 1004. Similar to FIG. 6, the Server Device 1002 will establish the association to one or more Groups 1010 of one or more Client Devices 1004 and provide a user interface for managing the capabilities and features accessible to each Group 1010 of one or more Client Devices 1004. The Server Device 1002 manages one or more Groups 1010 of Client Devices 1004 with configurations that include but are not limited to: Manage Devices 1054; Manage Groups 1056; Manage Users 1058; Tasks and Activities 1060; Learning Gamification Programs 1062, 1150; Rewards Programs 1064; and Server Preferences 1066.

FIG. 7 further illustrates that each Client Device 1004 within a Group 1010 of Client Devices 1004 will individually authenticate and associate to the Server Device 1002 and provide a user interface for utilizing the enabled and allowed capabilities and features. The Client Device 1004 enabled and allowed capabilities and features include but not limited to: Applications 1068; Device Features 1070; Calendar 1072; Safety Features 1074; Content 1076; Tasks and Activities 1078; Learning Gamification Programs 1062, 1080; and User Preferences 1082.

Figure 8:
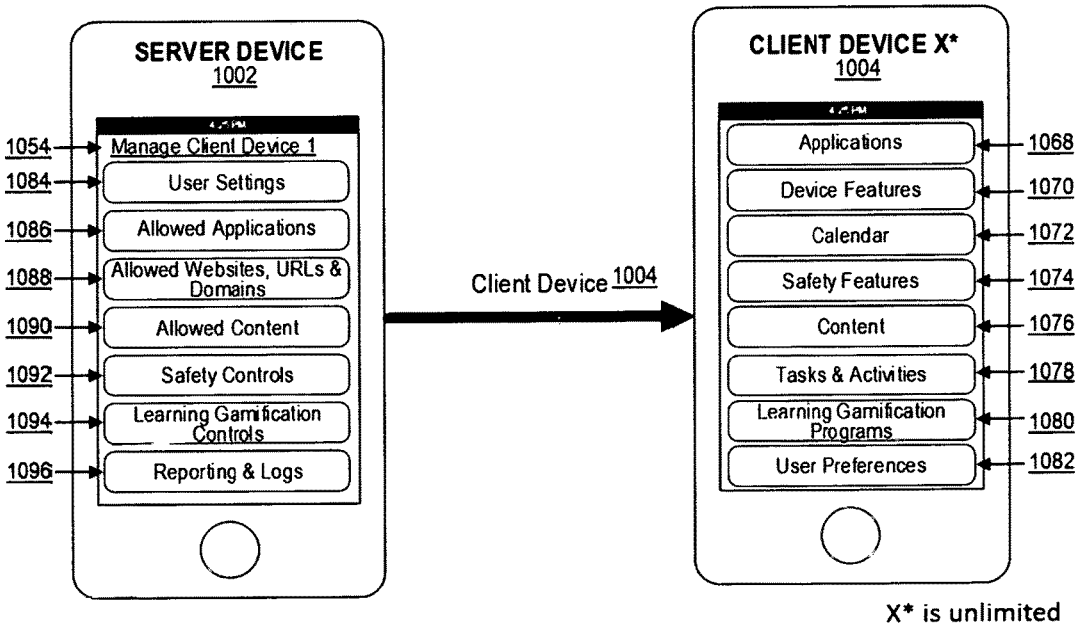
FIG. 8 illustrates an example of how the Server Device controls and manages related features and capabilities installed on a Group of one or more Client Devices, whereas the number of Groups and number of Client Devices are unlimited by the Learning Gamification and Safety Control Application.

FIG. 8 illustrates an example of Server Device Controls and Client Device Capabilities. This diagram shows how the Server Device 1002 controls and manages related features and capabilities installed on one or more Client Devices 1004, or Groups 1010 of Client Devices 1004. The Server Device 1002 will establish the association to one or more Client Devices 1004 and provide a user interface for managing the capabilities and features accessible to the Client Devices 1004. The Server Device 1002 allows the user to Manage a Client Device 1054, 1004 with configurations that include but not limited to: User Settings 1084; Allowed Applications 1068, 1086; Allowed Websites, URLs, and Domains 1088; Allowed Content 1076, 1090; Safety Controls 1092; Learning Gamification Controls 1094; and Reporting and Logs 1096.

FIG. 8 further illustrates the Client Devices 1004 will authenticate and associate to the Server. Device 1002 and provide a user interface for utilizing the enabled and allowed capabilities and features. The Client Device 1004 enabled and allowed capabilities and features include but are not limited to: Applications 1068; Device Features 1070; Calendar 1072; Safety Features 1074; Tasks and Activities 1078; Learning Gamification Program 1080, 1124; and User Preferences 1082.

Figure 9:
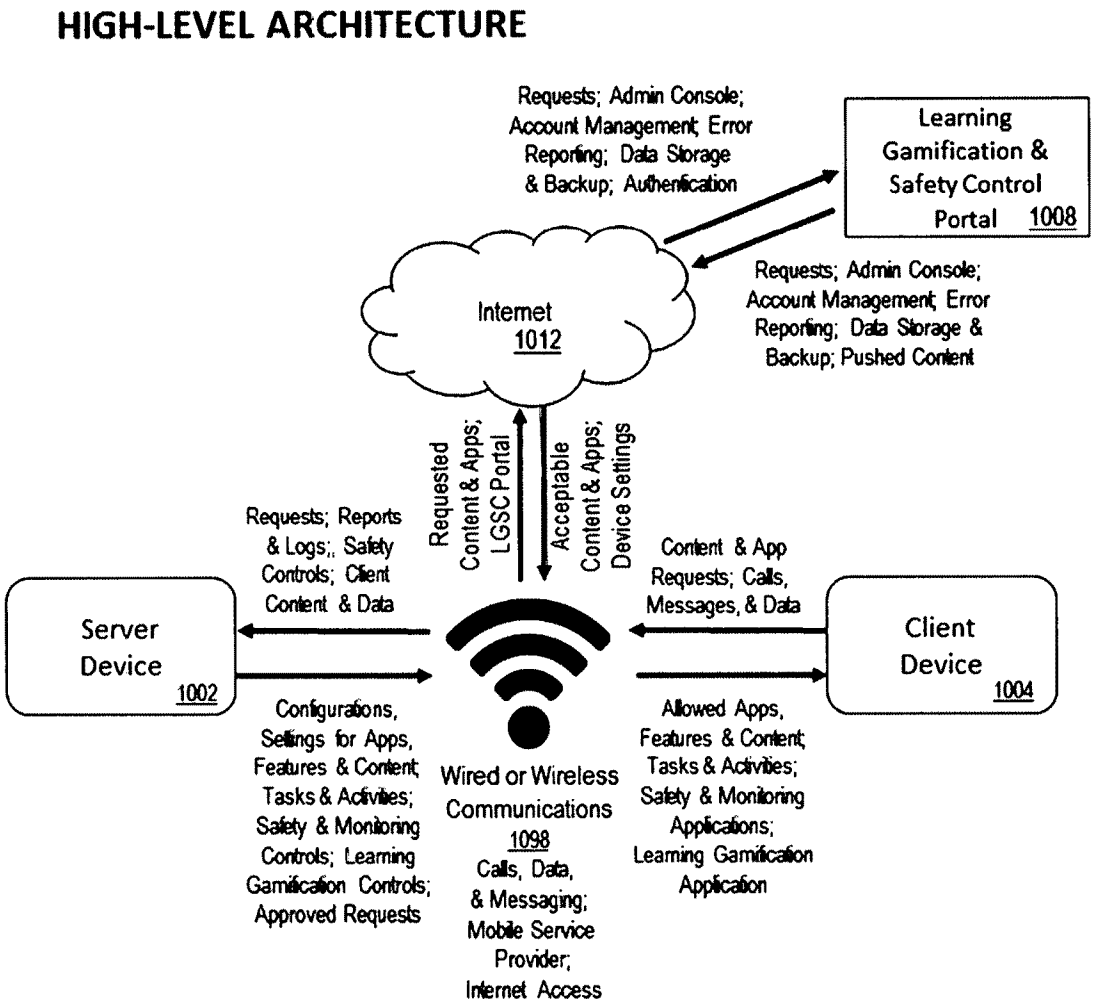
FIG. 9 illustrates the high-level architecture for the Server Device and Client Device utilizing Wired or Wireless Communications to access the Internet and Learning Gamification and Safety Control Portal.

FIG. 9 illustrates the High-Level Architecture. FIG. 9 illustrates how the Server Device 1002 and Client Device 1004 utilize Wired and Wireless Communications 1098 to access the Internet 1012 and Learning Gamification and Safety Control Portal 1008. The Server Device 1002 communicates with the Client Devices 1004 using the existing wireless communications hardware and software installed on the computing device to send and receive various instructions, commands, applications, and content to one or more Client Devices 1004 or Groups 1010 of Client Devices 1004. Utilizing the Wired and Wireless Communications 1098 to access the Internet 1012, the Server Device 1002 and Client Devices 1004 automatically update with the relevant applications, content, features, and capabilities installed and configured as enabled and/or allowed by the Server Device 1002.

FIG. 9 further illustrates that the Server Device 1002 interacts with the Client Device(s) 1004 or Groups 1010 of Client Devices 1004, whether individually or in a Group 1010, and Learning Gamification and Safety Control Portal 1008 using the Wired and Wireless Communications 1098 features and capabilities to transmit data that includes but not limited to: Configurations; Settings for Applications, Features, and Content; Tasks and Activities 1060, 1078; Safety and Monitoring Controls and Settings, Learning Gamification Controls and Settings 1094; and Approved Requests; Allowed Applications, Features, and Content; Safety and Monitoring Applications; and Learning Gamification Application.

FIG. 9 further illustrates that the Client Devices 1004 interacts with the Server Device 1002 and Learning Gamification and Safety Control Portal 1008 using the Wired and Wireless Communications 1098 features and capabilities to transmit data that includes but not limited to: Content Requests 1090, 1076; Application Requests 1086, 1068; Device Features 1070 (includes but not limited to phone calling, text and SMS messaging, video calling, image and video viewers, contact manager, calendar, video player and other device features pre-installed by the device manufacturer and intended for the specific device); Safety Features 1074 (includes but not limited to Emergency Mode 1118, device locator, parental controls, user and usage reporting; camera, flashlight, and other device features pre-installed by the device manufacturer and intended for the specific device) 1070; Reports and Logs 1096; Safety Controls 1092; Client Content and Data 1076, 1090.

FIG. 9 further illustrates that the Wired and Wireless Communications 1098 features and capabilities provide the Server Device 1002, Client Devices 1004 and Groups 1010 of Client Devices 1004 with access to the Internet 1012 and the Learning Gamification and Safety Control Portal 1008. The Wired and Wireless Communications 1098 include capabilities to answer incoming and complete outgoing audio and video phone calls, transmit data, and respond to and create outgoing messages using a mobile service provider.

FIG. 9 further illustrates the Learning Gamification and Safety Control Portal 1008 provides the Server Device 1002, Client Devices 1004 and Groups 1010 of Client Devices 1004 with features and capabilities that operate using data that includes but not limited to: Requested Content; Requested Applications; Administrator Console; Account Management; Error Reporting; Data Storage; Device Backup; Authentication; Pushed Content, Acceptable Content; Acceptable Applications; and Device Settings.

The invention claimed is:

[1. A method for enabling a server device to control at least one client device, the method comprising the steps of:

providing a server device having a control application loaded thereon and a user interface, wherein the user interface enables the server device to control one or more associated client devices via the control application;

installing a control application via the user interface to each of the one or more associated client devices controllable by the server device;

connecting the server device and each of the one or more associated client devices to a wireless network;

providing direct bi-directional communication between the server device and each of the one or more associated client devices via the wireless network, wherein the direct bi-directional communication allows the control application of the server device to manage application configurations and settings of each associated client device;

controlling the one or more client devices by performing at least one of the following steps:

managing each of the one or more associated client devices using the server device, wherein the step of managing comprises at least one of the steps of:

creating and editing calendar events;

creating, editing, and updating tasks;

creating and updating a timer for measuring days and time with timer functionality;

setting and assigning user-defined requirements and user-defined expectations with timer functionality;

creating one or more timer activities, wherein the timer activities involve one or more requirements and one or more expectations that include one or more mobile applications or tasks with pre-defined expectations corresponding to one or more rewards;

configuring allowed and disallowed mobile applications based on settings that include age appropriate content, category, rating, and content type;

configuring allowed and disallowed content based on settings that include age appropriate content, category, rating, and content type;

enabling and disabling mobile applications based on age appropriate content, category, rating, and content type;

enabling and disabling access and control;

controlling access to mobile applications based on settings established by the server device user that include age appropriate content, category, rating, and content type;

configuring allowed and disallowed URLs based on settings that include age appropriate content, category, rating and content type;

receiving, viewing and resetting usage history;

remotely installing and removing mobile applications;

remotely triggering an erase feature of selected applications or data;

remotely deleting all data and applications;

remotely configuring and controlling, enabling and disabling wireless network access;

remotely configuring and controlling, enabling and disabling a key and screen logger application;

remotely configuring and controlling, enabling and disabling an existing camera application;

remotely configuring and controlling, enabling and disabling, an existing screenshot application;

sending computerized instructions from the server device to the one or more associated client devices that enables instant audio or video communications between the server device and the one or more client devices;

controlling an ability for the server device user to create, edit, or delete contact records;

controlling an ability for the server device to disable or password protect a delete function;

creating alerts and notifications and associating the alert or notification to at least one of a task, calendar event, and timer activity;

initiating emergency calls and activating an emergency mode by pressing a user-defined sequence of numbers, referred to as a personal identification number; and initiating a device locator feature.]

2. The method as recited in claim [1] *6*, further comprising the steps of:

managing the server device and each of the one or more associated client device settings using the server device and a web-based administrator portal; and offering monitoring, support, and administrative services via a web-based administrator portal, for a fee.

3. A method as recited in claim [1] *6*, further comprising *at least one of* the [step] *following steps* of:

enabling the server device user to control and monitor the features and usage of each of the one or more client devices;

enabling the server device user to configure settings, features, and usage of each of the one or more client devices;

enabling the server device user to create, edit, and view tasks and calendar activities, events, and records on each of the one or more client devices;

enabling each of the one or more client device users to perform each of one or more tasks, activities, events, or records created and assigned to each respective client device;

enabling each of the one or more client device users to run, pause, and complete one or more requirements and expectations created and assigned to each respective client device;

enabling each of the one or more client device users to access each of one or more allowed mobile applications, websites, URLs, content, or features based on the configurations and settings defined by the server device;

enabling each of the one or more client device users to operate, play, or view each of the one or more allowed mobile applications, websites, URLs content, or features based on the configurations and settings defined by the server device;

enabling the server device to access, monitor, and view usage history for each of the one or more client devices;

enabling the server device to access, capture, transmit, and erase audio, video, and images from each of the one or more client devices to the server device or other pre-defined location;

enabling the server device to access, capture, transmit, and erase report logs created by the key and screen logger application from each of the one or more client devices;

enabling the server device to access, capture and transmit audio, video, and images to the server device using the camera application from each of the one or more client devices;

enabling the server device to access, capture, transmit, and erase audio, video, and images to the server device using the screenshot application from each of the one or more client devices;

enabling the server device to take control of each of the one or more client devices by disabling an on/off switch, volume, screen, and other buttons and switches built into the device without powering a screen, similar to turning off the device, for each of the one or more client devices;

enabling the server device to erase all or selected data or applications, or delete all data and applications on each of the one or more client devices;

enabling the server device to create, edit, or delete contact records on each of the one or more client devices; *and* enabling the server device to create, edit, and view emails for one or more email accounts using the existing email application on each device for each of the one or more client devices.

4. A method as recited in claim [1] *6*, further comprising the step of associating a server device with the one or more client devices to access a password protected administrative interface for at least one of the steps of:

creating and maintaining a customer account utilizing account management functionality;

creating and maintaining a profile utilizing profile management functionality for each client device user and the server device user;

creating and maintaining a purchase and payment history;

activating or deactivating the server device or the one or more client devices;

allowing the server device to create, change, or delete a masked password that controls each of the one or more client devices;

allowing each *of the one or more* client device to access the password protected administrative interface if the user enters the correct password, as defined and controlled by the server device;

entering and updating a unique license key issued for each server device and client device, as necessary to enable and operate the control application;

accessing a purchase history for the server device and each of the one or more client devices;

accessing each of the one or more client device usage history reports or logs with date and time stamps and details on applications accessed, time duration by application, URL's accessed, time duration by URL, tasks completed, time to complete tasks, incomplete tasks, texts and text history, phone call history, emails and email history, instant messaging and message history, video and image history;

allowing an account holder to view, enter, and delete credit or debit card information and process payments for licensing server devices and client devices to operate the Control Application;

allowing an account holder to create, edit, and delete each of the one or more groups of devices;

allowing an account holder to create, edit, and delete each of the one or more server device users;

allowing an account holder to assign and un-assign one or more device groups to each of the one or more server device users;

allowing the server device user to create, edit, and delete each of the one or more client devices users;

allowing the server device user assigned to a device group to assign and un-assign each of the one or more client devices to device groups;

allowing the one or more server device users to assign and un-assign one or more client devices to each of the one or more client device users, respectively;

allowing the server device user to create, edit, and delete one or more timers with one or more user-defined requirements, expectations, and rewards for each of the one or more client devices;

allowing the server device user to designate one or more applications as allowed or disallowed, and assign one or more requirements, expectations, and rewards to each allowed application for each of the one or more client devices;

allowing the server device user to designate one or more Internet websites, URLs, or domains as allowed or disallowed and assign one or more requirements, expectations, and rewards to each allowed website, URL, or domain for each of the one or more client devices;

allowing the server device user to enable and disable each of the one or more client devices based on a user-defined programmable schedule;

allowing the server device user to configure and trigger a data erase feature on each of the one or more client devices to erase the entire device or one or more user-defined applications or databases, or other content installed on the client device;

allowing the server device user to track and locate each of the one or more client devices;

allowing the server device to install one or more mobile applications on each of the one or more client devices;

allowing the server and client devices to communicate using any Internet-accessible access point or wireless service;

allowing the server device to enable or disable each of the one or more client devices;

allowing the server device to send one or more emergency notifications, alerts, and messages to each of the one or more client devices;

allowing each client device to send one or more emergency notifications, alerts, and messages to one or more server devices;

allowing the server device to setup notifications, alerts and messages for the server and client devices; and allowing the server and client devices to access and utilize the telephone and text features for emergency purposes without restrictions.

5. A method as recited in claim [1] *6*, further comprising the step of allowing the server device and the one or more client devices to integrate with peripheral devices attached to a computer network, local computer, or the device using a device data cable or existing wireless communication features.

*6. A method for enabling a server device to control one or more client devices, the method comprising the steps of:*

*providing a server control application for loading onto the server device, the server control application having a user interface which enables control of the one or more client devices each having a client control application loaded thereon:*

*preventing uninstallation of the client control application by the one or more client devices based on parameters set by the server device;*

*providing bi-directional connectivity of the server and the one or more client devices to a wireless network;*

*allowing the server device management of the application configurations and settings on the one or more client devices via the client control application;*

*wherein, the server device manages application configurations and settings of the one or more client devices by performing at least one of the following steps:*

*creating and editing calendar events;*

*creating, editing, and updating tasks;*

*creating and updating a timer for measuring days and time with timer functionality;*

*setting and assigning user-defined requirements and user-defined expectations with timer functionality;*

*creating one or more timer activities, wherein the timer activities involve one or more requirements and one or more expectations that include one or more mobile applications or tasks with pre-defined expectations corresponding to one or more rewards;*

*configuring allowed and disallowed mobile applications based on settings that include age-appropriate content, category, rating, and content type;*

*configuring allowed and disallowed content based on settings that include age-appropriate content, category, rating, and content type;*

*enabling and disabling mobile applications based on age-appropriate content, category, rating, and content type;*

*enabling and disabling access and control;*

*controlling access to mobile applications based on settings established by the server device user that include age-appropriate content, category, rating, and content type;*

*configuring allowed and disallowed URLs based on settings that include age-appropriate content, category, rating and content type;*

*receiving, viewing, and resetting usage history;*

*remotely installing and removing mobile applications;*

*remotely triggering an erase feature of selected applications or data;*

*remotely deleting all data and applications;*

*remotely configuring and controlling, enabling, and disabling wireless network access;*

*remotely configuring and controlling, enabling, and disabling a key and screen logger application;*

*remotely configuring and controlling, enabling, and disabling an existing camera application;*

*remotely configuring and controlling, enabling, and disabling, an existing screenshot application;*

*sending computerized instructions to the one or more client devices that enables instant audio or video communications between the server device and the one or more client devices;*

*controlling an ability for the server device user to create, edit, or delete contact records;*

*controlling an ability for the server device to disable or password protect a delete function;*

*creating alerts and notifications and associating the alert or notification to at least one of a task, calendar event, and timer activity;*

*initiating emergency calls and activating an emergency mode by pressing a user-defined sequence of numbers, referred to as a personal identification number; and*

*initiating a device locator feature.*

* * * * *